F. A. FOX.
ANTISKID DEVICE FOR TIRES.
APPLICATION FILED OCT. 24, 1908.
915,843.
Patented Mar. 23, 1909.
2 SHEETS—SHEET 2.
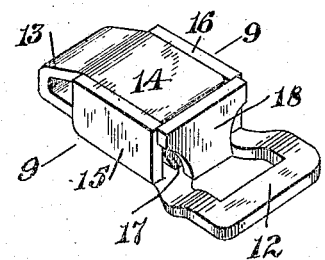
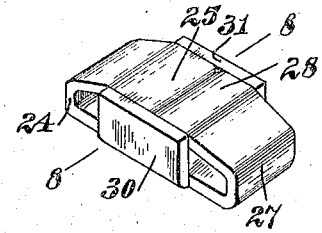
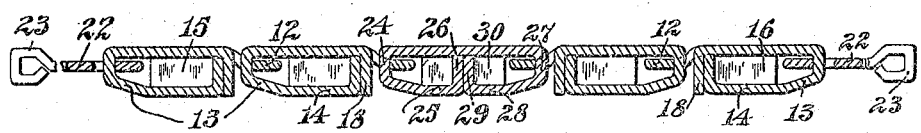
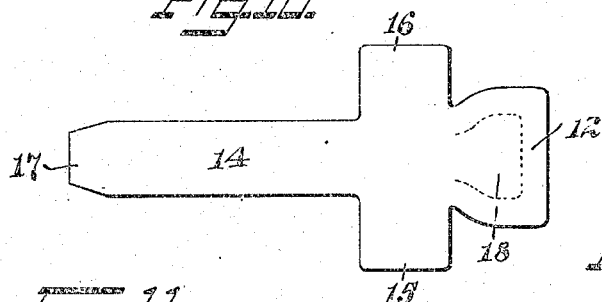
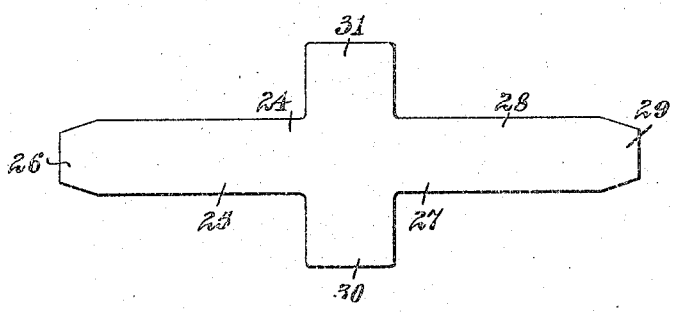
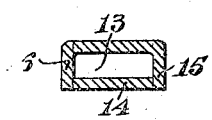
Witnesses:
Inventor:
Frank A. Fox,
By his Attorney,

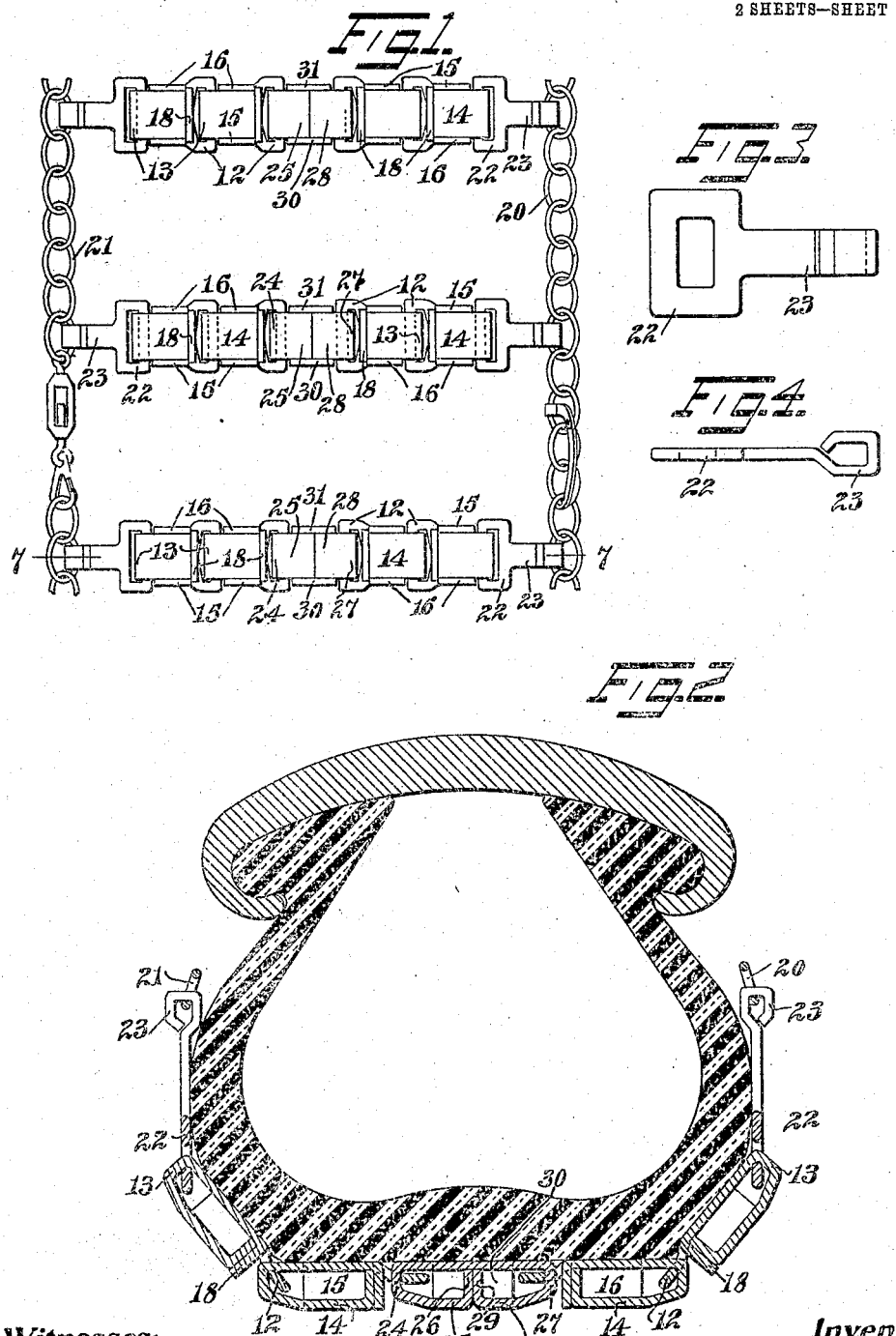

UNITED STATES PATENT OFFICE.

FRANK A. FOX, OF NEW YORK, N. Y., ASSIGNOR TO FOX METALLIC TIRE BELT COMPANY, OF NEW YORK, N. Y., A CORPORATION OF NEW YORK.

ANTISKID DEVICE FOR TIRES.

No. 915,843.　　　Specification of Letters Patent.　　　Patented March 23, 1909.

Application filed October 24, 1908. Serial No. 459,297.

*To all whom it may concern:*

Be it known that I, FRANK A. FOX, a citizen of the United States, residing in New York city, in the county of New York and State of New York, have invented certain new and useful Improvements in Antiskid Devices for Tires, of which the following is a specification.

This invention relates to anti-skid devices for tires especially of the pneumatic type, and has for its object to provide an improved form of tread for the link in which on the opposite sides of the tread face there will form sharp edges for engaging the ground.
A further object is to provide an upwardly projecting lug extending transversely and forming a tread portion, which is formed by bending upward the material at the opening for the eye.
In the accompanying drawings showing embodiments of my invention, Figure 1 is a view of a portion of the chain showing three of the cross members. Fig. 2 is a transverse cross section taken through the tire and one of the cross chains. Figs. 3 and 4 show the connecting link at the ends of the cross members. Fig. 5 shows in perspective one of the links of the cross member. Fig. 6 shows another form of link. Fig. 7 is a cross section on the line 7—7 indicated in Fig. 1. Fig. 8 is a section on the line 8—8 indicated in Fig. 6. Fig. 9 is a section on the line 9—9 indicated in Fig. 5. Fig. 10 shows the blank from which the link of Fig. 5 is formed, and Fig. 11 shows the blank for the link of Fig. 6.

The present form of link comprises essentially articulating portions on the ends of the links by which they are joined together, and having on the two transverse sides upwardly projecting lugs, the ends of which form tread portions. These lugs are preferably supported on their inner sides. Another essential feature is an upturned lug extending transversely of the link and transversely to the said lugs, which lug is formed by bending upward the material at the eye opening; instead of removing such material to leave a clear opening. The support for the two side lugs is preferably an extension of the hook portion of the link, that engages the eye of the corresponding adjacent link.

In the construction illustrated, the link is provided with an eye portion 12 at one end, and a hook portion 13 at the other end. On opposite sides are upturned lugs 15 and 16. The hook portion has an extension 14 engaging the inner sides of the lugs at their top and thereby supports them from being bent inward, and in conjunction with their end portions form the tread portions for the link. The extension 14 has an integral supporting portion, preferably having its extremity 17 bent downward to engage the base. In forming the eye portion 12, the material that would be removed to form the openings, is bent upward in the form of a lug 18; such material being severed at three sides of the opening with one side joining at which it is bent upward. The top edge of the lug 18 is flush with the top edge of the side lugs 15 and 16, and with the tread portion 14 of the hook. The eye portion 12 is preferably given a slight upward bend from the base so that the links can all lie in the same plane when joined as indicated in Fig. 7. And the tread portion 14 of the hook is located above the plane of the engagement of the hook portion with the hook portion, whereby the tread portion can wear entirely through before the hook will disengage the eye. By this construction it will be seen that on both sides of the series of links there is a sharp edge formed by the ends of the two side lugs, whereby the tread portion of the hook is strongly protected against wear. There is also the transverse lug 18 having its end portion engaging the ground and producing even greater friction.

At the ends links are provided for engaging the side chains 20 and 21, that may comprise an eye portion 22 engaging the hook 13 and a hook portion 23 for engaging the side chain. The links are preferably reverse on the two end portions of the cross members which is done by a double hook member shown separate in Fig. 6. In this arrangement, the link has a hook 24 at one end having a tread portion 25 with the end 26 bent downward to engage the base and support the tread portion. The link has a similar hook portion 27 on the opposite side bent upward to form a tread portion 28 with the end 29 bent downward in engagement with the bent portion 26 to engage the base and support the tread face. The two tread faces are arranged parallel. At the opposite transverse sides are upwardly projecting lugs 30 and 31 engaging the sides of the tread portions of the hooks with their ends flush with the said tread portion. The two hooks will engage the eyes of the adjacent links as shown in Fig. 7 thereby providing a hook portion at each side of the crossing member for connection with the side chain by the said links. This center link has the same edge of side lugs with their ends engaging the ground to prevent a sharp edge and provide a strong friction and engagement with the road.

Having thus described my invention, I claim:

1. In a device of the character described, a cross member consisting of a series of links articulated at their ends, the links having integral lugs projecting upwardly from the base on each lateral side, and a tongue portion extending longitudinally and engaging the lugs along their extremities.

2. In a device of the character described, a cross member consisting of a series of links articulated at their ends, the links having integral lugs projecting upward from the base on each lateral side, a tongue portion extending longitudinally and engaging the lugs adjacent their extremities, and a transversely extending lug bent upward from the base with its top forming a tread portion.

3. In a device of the character described, a cross member consisting of a series of links having integral hook and eye portions by which they are jointed, the hook portions of the links being extended along the link to form a tread portion, and an integral lug bent upward on each of the two transverse sides with its end portion engaging the side of the extended hook portion and forming a tread portion.

4. In a device of the character described, a cross member consisting of a series of links having integral hook and eye portions by which they are jointed, the hook portions of the links being extended along the link to form a tread portion, an integral lug bent upward on each of the two transverse sides with its extremity engaging the side of the extended hook portion and forming a tread portion, and an integral portion supporting said tongue extension.

5. In a device of the character described, a cross member consisting of a series of links having integral hook and eye portions by which they are jointed, the hook portions of the links being extended along the link to form a tread portion, an integral lug bent upward on each of the two transverse sides with its extremity engaging the side of the extended hook portion and forming a tread portion, and a transverse lug portion bent upward from the eye opening and engaging the end portions of the side lugs to form a tread portion.

6. In a device of the character described, a cross member consisting of a series of links having integral hook and eye portions by which they are jointed, the hook portions of the links being extended along the link to form a tread portion, and an integral lug bent upward on each of the two transverse sides with its extremity engaging the side of the extended hook portion and forming a tread portion, the extremity of the hook extension being bent downward to engage the base and support the tread portion.

7. In a device of the character described, a cross member consisting of a series of links having integral hook and eye portions by which they are jointed, the hook portions of the links being extended along the link to form a tread portion, and an integral lug bent upward on each of the two transverse sides with its extremity engaging the side of the extended hook portion and forming a tread portion, the extremity of the hook extension being bent downward to engage the base and support the tread portion, a transverse lug portion bent upward from the eye opening adjacent the said bent hook extension to form a tread portion, and a link in the cross member having hook portions on two opposite ends, with a lug bent upward on each transverse side engaging the sides of the hook portions.

8. In a device of the character described, a cross member consisting of a series of links having integral hook and eye portions by which they are jointed, the hook portions of the links being extended along the link to form a tread portion, and an integral lug bent upward on each of the two transverse sides with its extremity engaging the side of the extended hook portion and forming a tread portion, the extremity of the hook extension being bent downward to engage the base and support the tread portion, a transverse lug portion bent upward from the eye opening adjacent the said bent hook extension to form a tread portion, and a link in the cross member having hook portions on two opposite sides extended and having their ends bent downward in engagement with the base, and a lug bent upward on each transverse side in engagement with the said extension to form tread portions.

FRANK A. FOX.

Witnesses:
WILLIAM H. REID,
HENRY E. GREENWOOD.